United States Patent [19]

Hattori et al.

[11] Patent Number: 4,746,574
[45] Date of Patent: May 24, 1988

[54] ANTISTATIC SHEETING

[75] Inventors: Eiji Hattori, Suzuka; Mitsuji Ebara, Ageo, both of Japan

[73] Assignee: Asahi Chemical Polyflex Ltd., Tokyo, Japan

[21] Appl. No.: 18,863

[22] Filed: Feb. 25, 1987

Related U.S. Application Data

[63] Continuation of Ser. No. 778,982, Sep. 23, 1985, abandoned.

[30] Foreign Application Priority Data

Sep. 25, 1984 [JP] Japan ................................ 59-199975
Sep. 27, 1984 [JP] Japan ................................ 59-200398

[51] Int. Cl.$^4$ ...................... B32B 9/00; B32B 23/02; B65D 73/02
[52] U.S. Cl. .................................. 428/409; 428/192; 428/212; 428/279; 428/458; 428/918; 428/922; 206/332
[58] Field of Search ............... 428/192, 212, 279, 409, 428/458, 918, 922; 206/332

[56] References Cited

U.S. PATENT DOCUMENTS 4,096,306  6/1978  Larson ................................ 428/192
4,156,751  5/1979  Yenni, Jr. et al. .................. 428/212
4,469,747  9/1984  Sasaki et al. ....................... 428/325

FOREIGN PATENT DOCUMENTS 0042455  7/1981  Japan .
8031749  2/1983  Japan ..................................... 428/35
8024449  2/1983  Japan ..................................... 428/35

Primary Examiner—John E. Kittle
Assistant Examiner—Patrick J. Ryan
Attorney, Agent, or Firm—Birch, Stewart, Kolasch & Birch

[57] ABSTRACT

An antistatic sheet material comprises a substrate layer, an electroconductive layer, and a surface layer. The electroconductive layer is disposed on the substrate layer and contains carbon black in such a manner that the carbon black partly protrudes into the surface layer. The surface layer is a thin transparent plastic layer. The sheet material possesses decreased surface resistance and exhibits excellent antistatic properties. The sheet material permits an object held thereunder to be clearly seen therethrough and enjoys high resistance to surface friction and never deteriorates any object which is in contact therewith. Thus, the sheet material of this invention is used advantageously as containers for objects which by their nature are vulnerable to electrostatic damage.

20 Claims, 3 Drawing Sheets

ANTISTATIC SHEETING

This is a continuation of application Ser. No. 778,982, filed Sept. 23, 1985 and now abandoned.

FIELD OF THE INVENTION AND RELATED ART STATEMENT

This invention relates to an antistatic sheet material for use as packages of objects vulnerable to electrostatic damage and permits what is wrapped therein to be seen, and also to containers such as bags, tubes, and boxes which are made of the sheet material.

As material for covering ICs and other electronic parts vulnerable to electrostatic damage and permitting their contents to be seen, bags of a polyolefin film having an antistatic agent blended therein, and bags of a laminate film consisting of a film coated with a layer of metal sheet to avoid passage of light therethrough, and a polyolefin film having an antistatic agent blended therein have been known to the art (for information on the bags using a metal layer, refer to U.S. Pat. Nos. 4,154,344 and 4,156,751). The former bags have the disadvantage in that their antistatic property is poor and it is notably degraded particularly when the humidity is low. The latter bags have the disadvantage in that the thin layer of metal incorporated therein causes a sharp reflection peculiar to any metal and possibly prevents what is contained therein from being seen at a certain angle, that since the metal forming the layer by nature is chemically instable, the metal layer is heavily deteriorated by oxidation with time, and that when the vacuum deposited thin layer is made of a noble metal or nickel which is relatively stable, this metal layer causes the bags to be expensive. The present inventors continued a study on a film of carbon which is chemically stable, yield only minimal change in electrical conductivity due to humidity, causes no sharp, unpleasant reflection of light, and enjoys sufficient transparency and electrical conductivity. They have formerly perfected an invention relating to a carbon film and filed this invention for patent, which has resulted in Japanese Patent Laid-open Publication No. 42455/1983.

The invention of Japanese Patent Laid-open Publication No. 42455/1983 is aimed at producing a transparent, electro-conductive coating by the application on a substrate of an electroconductive material incorporating therein electroconductive carbon black. It indeed produces a packaging material which suffers from only minimal degradation of properties even in a dry atmosphere of low relative humidity. Unfortunately, however, this packaging material has low light transmittance and heavy haze and, therefore, renders visual perception of what is contained therein rather difficult. When the carbon black content of the coating is increased, the carbon black is liable to separate from the coating, so that when white filter paper is rubbed against the surface of the coating, it is stained black.

OBJECTS AND SUMMARY OF THE INVENTION

Accordingly, a primary object of this invention is to provide an improved, transparent antistatic sheet material which uses carbon black of the type having high chemical stability, only minimally deteriorating over a long time, experiencing virtually no degradation of electroconductivity even under low relative humidity, and generating no sharp, unpleasant reflection of light and, owing to the use of this carbon black as a principal electroconductive means, possesses improved transparency and repressed haze and permits what is contained therein to be seen readily therethrough, and precludes contamination due to separation of carbon black.

Another object of this invention is to provide an antistatic sheet material which possesses high mechanical strength, excels in ease of fabrication such as into bags, and offers high resistance to wear.

Yet another object of this invention is to provide a container constructed to protect an object susceptible to electrostatic damage.

The objects of this invention are accomplished by producing a sheet material of a special construction consisting of a substrate layer, an electroconductive layer, and a surface layer, by a procedure of applying a coating material containing carbon black as a principal electroconductive material by a method to be described in detail afterward on the substrate layer made of transparent plastic material and further applying thereon the surface layer of transparent material, and in forming the substrate layer, electroconductive layer, and surface layer, by selecting specific substances or specific compositions, and in fabricating containers from the sheeting, by producing these containers in a specific construction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 illustrates a laminate prepared by superimposing a heat-sealable layer D to the basic sheet material;

FIG. 3 illustrates a laminate prepared by disposing an auxiliary heat-sealable layer between C and D of the laminate shown in FIG. 2;

FIG. 4 illustrates a laminate prepared by superimposing a cushioning plastic sheet D' on the basic sheet material; and FIG. 5 illustrates a laminate prepared by further disposing an auxiliary heat-sealable layer on the layer D of the laminate shown in FIG. 4.

DETAILED DESCRIPTION OF THE PREFERRED EMBODIMENTS

Figure 1:
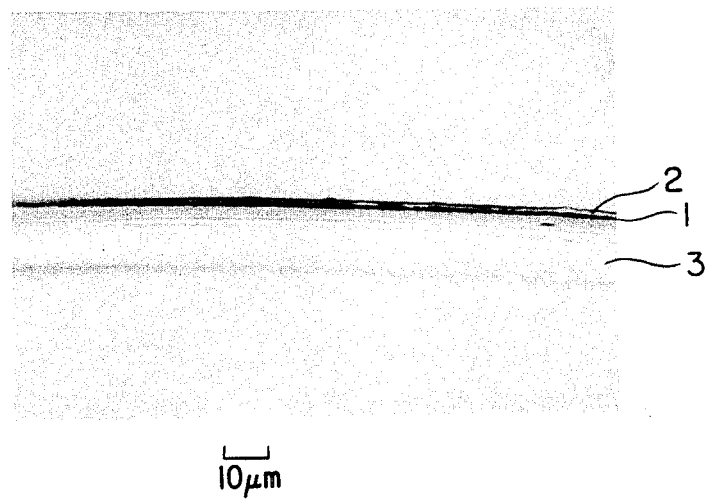
FIG. 1 is a photomicrograph of the cross section of a sheet material of Example 1 for illustrating the construction of an electroconductive layer in the sheet material of the present invention. 1 denotes an electroconductive layer, 2 a surface layer, and 3 a substrate layer. In the photograph, some proterbances of the electroconductive layer into the surface layer are evident.

The transparent plastic material to be used for the substrate layer in the sheet material of this invention is selected from among plastic materials which are transparent and suitable for production of packaging materials. For example, sheets of polystyrene, polyvinyl chloride, polyesters, polypropylene, polyethylene, cellulosic plastics, etc. are available.

The term "sheet material" embraces both the kind of sheet formed to a thickness of less than 0.254 mm and classified as film and the kind of sheet formed to a thickness of not less than 0.254 mm and classified as sheet in the case of flexible plastics and the kind of sheet formed to thicknesses of less than 0.076 mm and classified as film and the kind of sheet formed to a thickness of not less than 0.076 mm and classified as sheet in the case of rigid plastics.

For use in applications particularly requiring strength, biaxially stretched materials such as, for example, biaxially stretched polyester, biaxially stretched nylon, and biaxially stretched polypropylene are desirable.

For use in applications requiring heat seals, such materials as polyethylene, EVA, and modified PP which excel in heat-sealing property are desirable. Laminates obtained by superimposing these materials on other materials also form desirable materials. Laminates formed by superimposing materials having an excellent heat-sealing property on biaxially stretched films having high heat distortion points prove highly useful because they combine high strength and high heat-sealing property required for the production of bags, for example.

The film for the production of bags intended to contain ICs and other objects having protrusions desirably uses a biaxially stretched polyester film as a substrate and a polyolefin layer as a heat-sealing layer necessary for the fabrication of a bag. This film construction proves to be particularly advantageous because it possesses enough strength to resist fracture by protrusions, ease of fabrication, and ease of handling. The polyolefin layer is formed of polyethylene, EVA, or polypropylene. Optionally, the polyolefin layer may be subjected to an antistatic treatment, because the treatment given to this layer is particularly effective in improving the overall antistatic property of the produced sheet material. This antistatic treatment may be effected either by extruding a polyolefin coating containing an antistatic agent or by superimposing a polyolefin film containing an antistatic agent.

For use in applications to trays, tubular magazines, boxes, and plates, the sheet material is desirably formed of rigid polyvinyl chloride, polycarbonate, or biaxially stretched polystyrene to a relatively large thickness. An electroconductive layer is formed on the surface of a substrate layer.

The electroconductive layer, as its principal electroconductive material, uses carbon black which is inherently non-transparent. This layer must be formed in a specific construction adapted to confer transparency and satisfactory antistatic property upon the sheet material to be produced. For the purpose of the present invention, the electroconductive layer applied on the substrate layer contains therein carbon black in an amount of 0.8 to 0.01 $g/m^2$ of the surface of the layer.

Further, in this invention, the sheet material is constructed so that the carbon black protrudes partly into the surface layer.

The electroconductive layer of the construction of the foregoing description can be formed as described below. First, an electroconductive coating material containing carbon black is applied on the substrate to form a layer This electroconductive coating material uses carbon black as an electroconductive component and optionally contains therein a binder, a dispersant, a solvent, or a dispersion medium. The carbon black is desirably selected from among the grades of carbon black suitable for electroconductive fillers. A definite criterion for selection as to grain size, dispersibility, degree of graphitization by firing, degree of growth of structure, etc., remains to be established. It is wise to test several promising grades recommended for electroconductive fillers and single out a particular grade exhibiting sufficiently high transparency for a fixed level of electroconductivity.

The binder is selected in accordance with the requirement that it should exhibit as high adhesiveness to the substrate as permissible and should lend itself to promoting the dispersion of carbon black. Specific examples of the binder satisfying these requirements include such latexes as EVA latex, acrylic latex, and SB latex, PVA, cellulose derivatives, starch derivatives, acrylic type resins, and resins such as EVA type resins and styrene type resins which are used as dissolved in solvents.

The amount of the binder to be used requires special attention since use of the binder in an excessive amount must be avoided. The amount of the binder should be such that in the dried coating, the proportion of carbon black will become relatively large.

The requirement that the proportion of carbon black be large appears to logically contradict the object of producing a transparent coating. However, since the carbon black concentration in the dried coating is relatively low, the electroconductivity and the transparency are impaired in spite of improvement in the mechanical strength of the coating and repression of the contamination due to separation of carbon black. When the thickness of the coating is increased to improve the electroconductivity, the transparency of the coating is heavily impaired. The proper concentration of carbon black in the coating of the electroconductive layer is not easily fixed in a definite range, because it varies with the kind of carbon black to be used, the method for dispersion, the method for film formation, etc. Generally, it is desirably not less than about 8% by weight. When the method of film formation is proper, then the carbon black content may be even 100% by weight. In other words, carbon black particles may be bound by cohesion to form a coating without use of any binder.

As the dispersant, a surfactant may be incorporated as required. A certain latex inherently contains a small amount of surfactant and may obviate the necessity for incorporating any dispersant in particular. A certain binder which is used as dissolved in a solvent concurrently functions as a dispersant. The decision for or against the use of a dispersant and the decision on the amount of the selected dispersant to be used have to be made on a case by case basis.

The amount of carbon black in the electroconductive coating material is desirably as small as possible to the lower limit at which the necessary electroconductivity of the coating. The amount of carbon black varies with the kind of carbon black and the condition of dispersion. Generally, the upper limit of this amount is 0.8 $g/m^2$, preferably not more than 0.1 $g/m^2$ and the lower limit thereof is 0.01 $g/m^2$. If the amount of carbon black exceeds the upper limit mentioned above, the transparency of the coating is insufficient. If the amount is less than the lower limit, the coating fails to manifest the electroconductivity normally expected.

The average thickness of the electroconductive layer in which carbon black is dispersed in a substantially continuous layer is required to fall in the range of 5 μm to 0.01 μm, preferably 1 μm to 0.01 μm.

The electroconductive layer characteristically is required to be constructed so that the carbon black partly protrudes into the surface layer. This particular construction can be formed by a various methods.

One method comprises first forming an electroconductive layer having a low binder content and consequently possessing low mechanical strength, and then superimposing thereon a surface layer. In this case, the electroconductive layer is deformed and allowed to protrude partly into the surface layer due to the mechanical action generated by the liquid being applied for the formation of the surface layer or by the coating device.

Another method comprises preparing an electroconductive coating material of high enough consistency to resist leveling and applying the coating material in the form of fine dots by means of a gravure coater. In this case, the fine dots of the coating material so transferred are allowed to survive as protrusions.

A further method comprises allowing carbon black to be contained in the form of clustered particles in the electroconductive coating material. In this case, the clustered particles of carbon black are allowed to stand out of the electroconductive layer and protrude into the surface layer. The protrusions illustrated in Example 1 are formed of such clustered particles.

Yet another method comprises additionally incorporating fine electroconductive particles such as, for example, graphite or metal besides carbon black in the coating material. In this case, these additional particles contribute to forming protrusions.

Still another method comprises incorporating fine particles capable of readily adsorbing carbon. In this case, the fine particles are allowed to adsorb carbon thereon and, in that state, protrude into the surface layer.

The amount of such protrusions is not easily determined quantitatively. To be sufficient for the purpose of this invention, the protrusions should be readily discerned by observation through a microscope.

When the electroconductive layer assumes the specific layer construction as described above, the surface resistance offered by the surface of the surface layer can be significantly lowered. The cause for this effect has not yet been fully made clear. Since the protrusions of the electroconductive layer are considered to readily induce the concentration of electric charge, it may be logically concluded that the diffusion of electric charge in the interface between the surface layer and the electroconductive layer occurs mainly through the protrusions of the electroconductive layer.

The electroconductive layer generally fulfills its function satisfactorily when it is applied to a substantially uniform thickness on the substrate material. The thickness of the layer may be varied in a desired pattern when necessary. When continuous lines of a slightly increased thickness are crossed after the pattern of a net or arranged parallel to one another, they confer an effect of design on the produced electroconductive layer and, at the same time, enable the layer to enjoy sufficient transparency and repressed surface resistance in combination. When the electroconductive layer has its thickness or its carbon black concentration increased only in the portions corresponding to the aforementioned continuous lines so much as to be wholly deprived of transparency, the electroconductive layer as a whole is given sufficient transparency and, at the same time, the surface resistance is lowered to a significant extent.

The thin continuous lines of increased thickness or increased carbon black concentration per surface area can be produced by having a corresponding pattern formed on a gravure printing cylinder or by first forming an electroconductive layer of a uniform thickness on the entire surface of the substrate and subsequently applying thereon the same coating material in the aforementioned pattern. In this case, the continuous lines are desirably separated by as small intervals as permissible. These intervals are preferably less than 20 mm. The width of these continuous lins is preferably as small as possible, and preferably, it is required to be not more than 2 mm. When these lines are separated too widely, they fail to give sufficient protection against electrostatic damages. The width of these continuous lines is preferably as small as possible, and preferably, it is required to be not more than 2 mm. When the lines have a large width, they impair the transparency.

When the carbon black concentration in the involatile components of the electroconductive coating material exceeds 70% by weight, the coating material often exhibits insufficient adhesiveness to the substrate. When the carbon black concentration is increased, the electroconductivity exhibited by the produced electroconductive layer increases if the thickness of the layer of carbon black which permits sufficient transparency is decreased. The layer of the electroconductive coating material obtained at this stage appeares to be highly pervious to liquid. When a synthetic resin solution is directly applied on the electroconductive layer for the purpose of superimposing a surface layer, the synthetic resin solution is allowed to permeate the electroconductive layer and even reach the substrate at substantially no sacrifice to the electroconductivity of the layer of carbon black. When the synthetic resin for the surface layer is selected from among those synthetic resins possessing sufficient adhesiveness with the substrate, the adhesiveness between the electroconductive layer and the substrate can be enhanced.

Prior to application of the electroconductive coating material on the substrate, the substrate may be subjected to a corona discharge treatment so that it will be sufficiently wetted with the coating material or joined with increased fastness to the coating material. Alternatively, the substrate may be provided with an undercoat for the same purpose.

The surface layer can be formed by directly applying a transparent synthetic resin coating material on the layer formed in advance with an electroconductive coating material. Since the surface layer constitutes a surface coating of the antistatic plastic film or sheet, it is required to fulfill the various surface properties such as hardness, gloss, slippage, and resistance to blocking which any packaging material is expected to satisfy.

Since the surface layer forms the surface coating of the antistatic plastic film, it would normally seem desirable to use a synthetic resin of low electrical resistance for the surface layer. In actuality, however, the use of such a synthetic resin is not always necessary. Even when an ordinary polyolefin having extremely high volume resistivity is used as the thermoplastic resin for the surface layer, the surface layer directly superimposed on the electroconductive layer as already described is allowed to acquire a substantially lowered surface resistivity. Although this is literally an unexpected effect, the provision of those protrusions of the electroconductive layer into the surface layer may well be responsible if not entirely, for that effect.

Examples of the resin which can be used advantageously for the surface layer include polystyrene, polyvinyl chloride, cellulosic type plastics such as nitrocellulose, thermoplastic resins such as polyethylene, EVA, polyacrylic esters, polymethacrylic esters, polyvinylidene chloride, polyamides, and polyesters, and thermosetting resins such as phenol resin and epoxy resin. Such a resin can be applied in the form of an emulsion or solution. Otherwise, a corresponding polymerizable monomer may be applied on the substrate and the applied layer of the monomer may be polymerized.

Among the resins enumerated above, acrylic resins such as polyacrylic esters and polymethacrylic esters are particularly desirable in terms of strength, adhesiveness, and transparency.

Optionally, the surface layer may incorporate therein various additives such as wax for the enhancement of slippage and the improvement of wear resistance. A polyethylene type wax is particularly desirable because it improves wear resistance without contaminating packaged materials. The proper thickness of the surface layer is in the range of 10 $\mu$m to 0.2 $\mu$m. If the thickness of the surface layer is more than 10 $\mu$m, the produced sheet material fails to acquire a sufficient antistatic property. If the thickness is less than 0.2 $\mu$m, the sheet material fails to exhibit sufficient mechanical strength.

Figure 2:
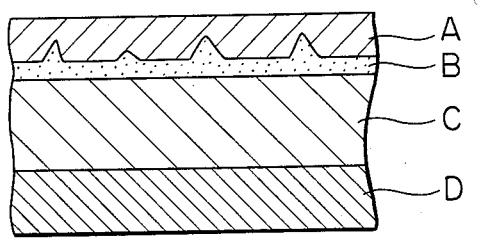
FIG. 2 to FIG. 5 are cross sectional showing the layer construction of laminates which are formed by constructing each of the layers 1, 2, and 3 of the basic sheet material with the selected materials, namely an electroconductive layer B, a surface layer A, and a substrate layer C and additionally superimposing another layer.

As a laminate using the basic antistatic sheet material of this invention, this invention provides an antistatic sheet material which has a transparent plastic layer A 0.2 to 10 $\mu$m in thickness, a carbon black-containing electroconductive layer B (with the carbon black partly protruding into the surface layer) 0.01 to 0.8 g/m² in application rate, a synthetic resin substrate layer C having a melting point of not less than 180° C., and a heat-sealable layer D of a vinylidene chloride type copolymer produced by the emulsion polymerization process and having a dry loss of 0.01 to 2%, superimposed in the order of A, B, C, and D. The layer structure of this laminate is illustrated in FIG. 2.

The substrate layer C supports the electroconductive layer B superimposed on the surface thereof and, at the same time, plays its own part in conferring on the produced film the overall strength required to be exhibited when the film is used as a wrap.

The substrate layer C is required to be formed of synthetic resin film having a melting point of not less than 180° C. If this layer is formed of synthetic resin film such as polyethylene or polypropylene which has a melting point of less than 180° C., for example, it melts and shrinks to the extent of fracturing the electroconductive layer B superimposed on its surface and preventing the produced film from exhibiting a satisfactory antistatic effect when the produced film is heat-sealed to produce a bag.

For the substrate layer C to support the electroconductive layer B and fulfil its own part as a foundation and enable the produced film to be easily handled as a wrap and possess ample transparency, it is desirably to be formed of transparent synthetic resin film measuring 5 to 50 $\mu$m in thickness, possessing a smooth surface, and excellent mechanical strength. Since objects to be wrapped in the produced film more often than not possess protuberances such as pins and burrs, the substrate layer desirably possesses sufficient resistance to the piercing force exerted by such protrusions. It is further desired to retain the smooth surface, the mechanical strength, and the transparency intact at temperatures not less than 140° C.

The substrate layer C desirably adheres with ample fastness to the layer which is superimposed thereon. From this point of view, it is desired to possess a wet surface tension of not less than 35 dynes/cm (as measured by the method of JIS K-6768). To acquire enhanced adhesive force, the surface of the synthetic resin film forming the substrate layer C may be treated with a corona discharge in advance.

Specific examples of the synthetic resin film usable for the formation of the substrate layer C are films of polyester, nylon, polyimide, cellulose acetate, and polyvinyl alcohol.

The heat-sealable layer D is intended to enable the produced film to exhibit satisfactory strength of heat seal during the course of manufacture of a bag and, at the same time, protect the bag against electrostatic charging originating in the interior of the bag.

This heat-sealable layer D is required to be formed of a vinylidene chloride type copolymer made by the emulsion polymerization process. As means of producing vinylidene chloride type copolymers, the suspension polymerization process and the emulsion polymerization process using an emulsifier are available. The films of vinylidene chloride type copolymers produced by the suspension polymerization process have surface resistivity exceeding $10^{16}$ $\Omega$. Even though the heat-sealable layer D is destined to make the inner wall surface of a bag which has less possibility of causing generation of heavy static electricity, the necessary prevention of electrostatic charging cannot be expected. Synthetic resins produced by the emulsion polymerization method include polyvinyl chloride, polyvinyl alcohol, and ethylene tetrafluoride other than the aforementioned vinylidene chloride type copolymers. These synthetic resins are deficient in heat sealing and liable to exhibit such undesirable phenomena as sticking and blocking.

The heat-sealable layer D can be formed by applying a vinylidene chloride type copolymer latex produced by the emulsion polymerization process on the substrate layer C and drying the applied layer of the latex, optionally after the surface of the substrate layer C has been subjected to the aforementioned corona discharge treatment or it has been covered with an anchor coat layer. The vinylidene chloride type copolymer desirably has a composition wherein the vinylidene chloride monomer accounts for a proportion of 50 to 95% by weight and the comonomer with which the vinylidene chloride monomer is copolymerized for a proportion of 5 to 50% by weight. Specific examples of the comonomer used advantageously in this copolymerization are vinyl chloride, acrylonitrile, methyl methacrylate, methyl acrylate, ethyl acrylate, and vinyl acetate. One member or a mixture of two or more members selected from the group of the comonomers enumerated above can be used.

As the emulsifier for the emulsion polymerization process, an anionic or nonionic surfactant can be used. Specific examples of the surfactant used advantageously are alkyl sulfonates, alkylaryl sulfonates having alkyl groups of 8 to 24 carbon atoms, and polyethylene glycol alkyl ether. In these surfactants, alkylaryl sulfonates are the optimal selections because they are not hydrolyzed with a strong acid. More particularly, polyoxyethylene lauryl ether, polyoxyethylene nonylphenyl ether, sodium dioctyl sulfosuccinate, and sodium dodecylbenzene sulfonate are preferably used.

The surface resistivity of the heat-sealable layer D is varied in the range of about $10^{19}$ to $10^{14}$ Ω, depending on the kind of the emulsifier in the polyvinylidene chloride latex and the amount of the emulsifier added. Thus, the emulsifier to be used is desirably selected from among commercially available emulsifiers of varying grade by a procedure of applying the latex containing a selected emulsifier on the substrate, drying the applied latex, and testing the dried latex layer for surface resistance.

The amount of the vinylidene chloride type copolymer latex to be applied for the formation of the heat-sealable layer D is only required to be not less than 1.0 g/m² as solids to satisfy the requirement of surface resistance. For the heat-sealable layer D to acquire satisfactory heat sealability, however, the vinylidene chloride type copolymer latex is desirably applied in an amount such that the applied latex, when dried, forms the heat-sealable layer D having a thickness of not less than $3\mu$, preferably a thickness in the range of 10 to $100\mu$. The application of the vinylidene chloride type copolymer latex can be effected by the use of an air knife coater, a gravure coater, a roll coater, or a Mayer bar coater, for example.

The anchor coat to be interposed between the substrate layer C and the heat-sealable layer D for the purpose of enhancing the adhesive strength of the two layers can be formed with an isocyanate type, imine type, polyester type, urethane type, or acryl type anchor coating agent or with chlorinated polypropylene. The amount of the anchor coat so interposed is not required to exceed 5 g/m² as solids. It can be formed by applying the aforementioned agent on the substrate layer C, allowing the applied layer of the agent to dry, and thereafter superimposing the heat-sealable layer D thereon.

Figure 3:
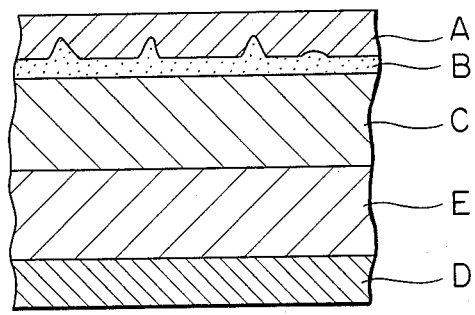

Optionally, an auxiliary heat-sealable layer E may be formed between the substrate layer C and the heat-sealable layer D as illustrated in FIG. 3. Since the heat-sealable layer D is not free to have enough thickness to acquire ample strength of thermal fusion, this auxiliary heat-sealable layer E is intended to enable the heat-sealable layer D to acquire as much strength of heat seal as required without reference to the thickness of the heat-sealable layer D. The incorporation of the auxiliary heat-sealable layer E has no possibility of increasing the surface resistance or entailing the phenomena of sticking and blocking because its surface is covered with the aforementioned heat-sealable layer D.

This auxiliary heat-sealable layer E fulfills its purpose sufficiently when it is made of synthetic resin having excellent transparency and heat sealability. A polyolefin is preferred in the sense that the layer made of the polyolefin concurrently serves to reinforce the film. Among numerous polyolefins, polyethylene, EVA, and polypropylene are particularly desirable. When the auxiliary heat-sealable layer E is used, it is desirably formed to such a thickness that the total thickness of this layer and the aforementioned heat-sealable layer D will be not less than 3 $\mu$m, preferably fall in the range of 10 to $100\mu$. The auxiliary heat-sealable layer E can be superimposed by a dry laminating method, extrusion coating method, or coextrusion coating method, for example. When the auxiliary heat-sealable layer E is incorporated, the heat-sealable layer D is superimposed in much the same way as described above on the auxiliary heat-sealable layer E, optionally after the surface of the auxiliary heat-sealable layer E has been subjected to a corona discharge treatment or covered with an anchor coat. In this case, the heat-sealable layer D acquires ample strength of heat seal even when its thickness is decreased to about $1\mu$.

The laminate formed of the aforementioned A, B, C, and D layers is enabled to acquire the practically necessary transparency because the electroconductive layer B is formed of an extremely thin dry layer of a carbon black-containing electroconductive coating material and further because the superimposition of the surface layer A serves to diminish the haze of the film. Further, this electroconductive layer B can be formed by simple procedure of applying the carbon black-containing coating material and drying the applied layer. It is applied fast in conjunction with the surface layer A to the substrate layer C. The electroconductive layer B, therefore, has no possibility of sustaining injuries under the external force exerted as by bending.

It has been confirmed that the heat-sealable layer D used in the present invention is able to acquire surface resistivity falling in the range of about $10^9$ to $10^{14}$ Ω and that it has less possibility of entailing such phenomena as sticking and blocking. The reason for this freedom of the layer from such undesirable phenomena is not clear. It is assumed that the water contained in the heat-sealable layer D lowers the surface resistance and, at the same time, the crystallinity possessed by the vinylidene chloride type copolymer makes the occurrence of sticking and blocking difficult.

Figure 4:
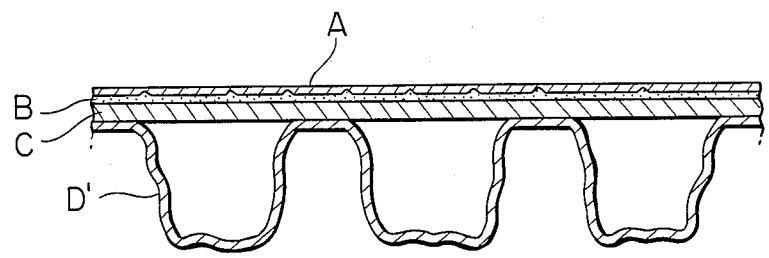

This invention further provides a cushioning antistatic sheet which has the same layer structure as the aforementioned laminate, except that the layer D is formed with a cushioning plastic sheet D' having a density in the range of 0.005 to 0.50 g/cm³. The layer structure of this laminate is shown in FIG. 4.

The cushioning plastic sheet D' is intended to confer on the produced laminate satisfactory heat seal strength necessary during the course of production of a bag, allow the produced bag to acquire a satisfactory cushioning property for protection of the contents against external shock, and prevent the bag from accumulation of static electricity originating in the interior of the bag.

The cushioning plastic sheet D' is required to possess a density in the range of 0.005 to 0.50 g/cm³. If the density of the sheet is less than 0.005 g/cm³, the ability of the sheet to retain the content of the bag intact is degraded and the mechanical strength of the sheet such as strength of thermal fusion and resistance to piercing force are insufficient. If the density of the sheet exceeds 0.50 g/cm³, the cushioning property of the sheet is not sufficient. The term "density" as used herein refers to the numerical value which is calculated by the following formula, using the apparent volume (V) of the cushioning plastic sheet and the weight (M) per apparent volume of the cushioning plastic sheet:

$$\text{Density (g/cm}^3) = M/V$$

For enabling the cushioning plastic sheet D' to acquire satisfactory thermal fusion strength and sufficient cushioning property, the proper thickness of the sheet D' is at least 0.2 mm. This plastic sheet is selected from foamed plastic sheets and air-entrapped plastic sheet made by using polyolefin type resins or type resins excelling in the property of thermal fusion. Among the polyolefins, polyethylene and polypropylene are particularly desirable as materials for the plastic sheets mentioned above.

The cushioning plastic sheet D' is required to be transparent. In this regard, the number of air bubbles distributed in the sheet in the direction of thickness cannot exceed 10. Desirably, this number is not more than 5 and more desirably, this number is not more than 3. Most desirably, this number is 1. If the number of air bubbles in the direction of thickness exceeds 10, the cloudiness of the film is high and the transmittance of light is low, impairing the transparency of the film.

The superimposition of the cushioning plastic sheet D' upon the substrate layer C can be effected by thermal pressure fushion, dry lamination, extrusion coating, or extrusion lamination. Optionally, these methods may be used in combination.

The outer surface of the cushioning plastic sheet D' should be wrinkled or undulated. When the laminate wraps a given object with the cushioning plastic sheet D' falling on the inner side, the wrinkles or the waves formed on the surface of the layer D' have the effect of holding the object fast even when the object is shaken or vibrated. As a result, the possibility of the laminate generating static electricity owing to the friction between the object and the layer D' is decreased. If the layer D' has a smooth surface devoid of wrinkles or undulations, the effect of keeping the object fast in place is lowered. The wrinkles or undulations in the layer D' are formed by heating the cushioning plastic sheet D' during the course of superimposition of the cushioning plastic sheet D' on the substrate layer C and subsequently cooling the hot plastic sheet D' gradually instead of cooling it suddenly or by applying strong tension on the sheet thereby winding the sheet in a tight roll during the course of taking up the sheet subsequently to the superimposition of the layers D' and C.

Figure 5:
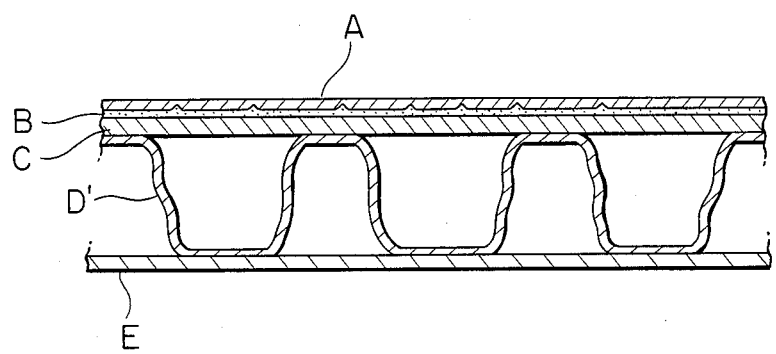

The cushioning plastic sheet D' desirably has an antistatic agent incorporated therein or applied thereon. Optionally, a polyolefin film E having an antistatic agent incorporated therein may be superimposed as an auxiliary heat-sealable layer on the cushioning plastic sheet D' as illustrated in FIG. 5. In this case, the cushioning plastic sheet D' may not have antistatic property without raising any special problem. This is because the antistatic agent contained in the auxiliary heat-sealable layer E passes into the cushioning plastic sheet D' and imparts thereto the necessary antistatic property. This auxiliary heat-sealable layer E is intended, when the cushioning plastic sheet D' has difficulty in acquiring sufficient strength of thermal fusion, to enable the cushioning plastic sheet D' to acquire ample thermal fusion strength. The incorporation of the auxiliary heat-sealable layer E neither impairs the cushioning property nor eliminates the wrinkles or undulations on the outer surface of the cushioning plastic sheet D'. When this auxiliary heat-sealable layer is incorporated, the proper thickness of this layer is in the range of 10 to 100 μm. The superposition of this layer can be effected by dry lamination or extrusion coating, for example.

The apparent volume resistivity of the surface layer, calculated from the values of surface resistance, is extremely low as demonstrated in the working examples to be cited afterward. The measurements and calculations involved herein are carried out as follows.

(1) Measurement of surface resistivity: This measurement is carried out by a method conforming to JIS K6911, with necessary modifications. A circular mercury electrode 5 cm in diameter and an annular mercury electrode 7 cm in inside diameter and 8 cm in outside diameter disposed concentrically around the circular mercury electrode are used. The contact surface area is 11.8 cm$^2$ on the annular electrode and 19.6 cm$^2$ on the circular electrode.

These two electrodes are placed in contact with a given surface to measure the magnitude of resistance between the two electrodes. Then, the surface resistivity is calculated on the basis of the following formula:

$$r = 18.8 rp (\Omega)$$

wherein rp ($\Omega$) represents the magnitude of resistance between the two electrodes and r ($\Omega$) the surface resistivity. Here, 18.8 is the constant to be fixed by the shape of the electrodes involved.

(2) Calculation of apparent volume resistivity of surface layer:

This calculation is performed in accordance with the following formula:

$$\Delta rp = rp2 - rp1$$

$$R = \Delta rp / 0.136 T (\Omega \cdot cm)$$

wherein T represents the thickness of the surface layer (in cm), rp1 the magnitude of resistance of the layer of the electroconductive coating material between the electrodes (in $\Omega$), rp2 the magnitude of resistance of the surface layer superimposed on the layer of the electroconductive coating material between the electrodes (in $\Omega$), and R the volume resistivity of the surface layer (in $\Omega \cdot cm$). Here, 0.136 is the constant to be fixed by the shape of the electrodes involved.

When a film is formed by superimposing an electroconductive layer and a surface layer only on one side of a substrate and a bag is made of this film in such a manner that the surface layer will form the outside of the bag, the bag has a satisfactory antistatic property. When this film is used to form a bag in such a manner that the surface layer forms the inside of the bag, the produced bag provides more effective protection to what is contained therein.

It has been confirmed that the bag having the surface layer on the outside suffers greater accumulation of static electricity in its content than the bag having the surface layer on the inside.

It has been known that the injuries inflicted on ICs by static electricity are mostly ascribable to injuries sustained by insulation films serving to insulate semiconductor components or conductor components in the elements. The injuries in the insulation films mostly occur in the paths of electric discharge from the electrically charged conductors (claimed, in most cases, to be human bodies) to conductor components or semiconductor components in the elements or in the paths of electric discharge from the conductor components or semiconductor components in electrically charged elements to the grounded conductors (such as human bodies). Thus, the prevention of conductors held in bags from accumulation of electricity constitutes a very important property.

When the aforementioned surface layer is formed on the inner side of the bag, the outer side of the bag is not always required to be provided an antistatic treatment. It is nevertheless desirable for the outer side to be rendered antistatic by having an antistatic agent incorporated in the outer surface or applied on the outer surface. It is likewise desirable to apply the surface layer superimposed on the layer of the electroconductive coating material on the inner and outer sides of the bag.

Containers other than bags, namely boxes, trays, cylinders, and magazines are desirably made of sheetings using substrates of high rigidity and large thickness. These containers may be produced by thermoforming the sheets.

Also in the containers of the above forms, the surface layer of low surface resistivity formed on the inner side of the container serves to prevent its contents from electrostatic hindrances.

The present invention will be described more specifically below with reference to working examples.

The strength of fracture dealt with in the working examples was measured as follows.

A given film was set between two frames embracing a space 100 mm square in area. With the frames held horizontally, an IC possessing 14 pins was mounted at the center of the film and the IC was pressed down at a speed of 50 mm/min. The magnitude of stress at which any of the pins pierced the film was found and reported in kg.

Light transmittance and haze were determined by methods conforming to JIS K 7105 with necessary modifications.

EXAMPLE 1

A dispersion was prepared by mixing 10% by weight of carbon black (electroconductive filler produced by Lion-Aczo Co., Ltd. and marketed under the trademark designation Ketschen Black EC), 8% by weight of a non-ionic surfactant as a dispersant, and a balance of water. Separately, as a binder, a solution was prepared by dissolving 9.2% by weight of partially saponified vinyl acetate in a mixed solvent consisting of 90 part by weight of methanol and 10 parts by weight of water. To 40 parts by weight of the dispersion of carbon black which was kept stirred, 60 parts by weight of the binder solution was added. Consequently, there was obtained an electroconductive coating material having 4% by weight of carbon black, 3.2% by weight of the surfactant, and 5.5% by weight of the binder contained in a mixed solvent consisting of methanol and water at a weight ratio of 56:44. This electroconductive coating material had an involatile component content of 12.7% by weight. Carbon black accounted for 31% by weight of the involatile component content.

Because of the use of the mixed solvent consisting of methanol and water, the drying speed was high, the surface tension was low, the application to plastic surface was easy, the dispersing activity of the non-ionic surfactant was slightly low, and the formation of clustered carbon black particles was easy as compared with the use of water as a solvent.

A biaxially stretched polyester film 12 μm in thickness had one surface thereof treated by a corona discharge. On the treated surface of the polyester film, the aforementioned electroconductive coating material was applied with a gravure coater at a rate of 0.2 g/m² on a dry basis. The applied layer was then dried. On the electroconductive layer thus produced, an overcoating material having 14.7% by weight of acrylic resin composed predominantly of methyl methacrylate and 0.3% by weight of polyethylene wax dissolved in toluene solvent was applied at a ratio of 1 g/m² on dry basis. The overcoating layer consequently formed was dried. On the assumption that the layers of coating material applied and dried as described above each had a specific gravity of 1, the thickness of the electroconductive layer was found to be about 0.2 μm and that of the surface layer to be about 1 μm. The results indicate that carbon black was applied at a rate of 0.06 g/m².

On the uncoated surface of this film, polyethylene containing 0.7% by weight of a non-ionic antistatic agent (product of Sanyo Chemical Industries Co., Ltd. marketed under trademark designation of Chemistat 1100) was superimposed to a thickness of 65 μm by the extrusion coating method, to form a heat-sealing layer.

In the film produced, the surface layer exhibited a surface resistivity of $9 \times 10^5 \Omega$ and the heat-sealing layer exhibited a surface resistivity of $8 \times 10^{11} \Omega$. The film as a whole exhibited a light transmittance of 45% and a haze of 13% and enabled what was held thereunder to be clearly seen therethrough.

A photomicrograph showing a cross section on the electroconductive layer and surface layer side of the film is illustrated in FIG. 1. In FIG. 1, protrusions of carbon black into the surface layer are evident.

This film was vigorously rubbed 50 times with a polyethylene film and was immediately tested for electric charge with a static field tester (produced by Rion Co., Ltd. and marketed under trademark designation EAO3). Consequently, electric charge was found to be 0 volt/cm on the surface layer side and 16 volts/cm on the polyethylene layer side, indicating that the film possessed an outstanding antistatic property. When this film was folded and heat sealed to produce bags, the bags were fabricated with great ease and with absolutely no rejection. The produced bags could be handled easily. By testing, the fracture strength of this film was found to be 1.5 kg, a value sufficiently high for wrapping ICs and other similar objects.

In a Gakushin type friction tester specified by JIS L-1048, a sample film was stretched in the place of white fabric on a friction member and subjected to a film-to-film friction test, to determine the number of frictions made until the surface resistance lost its initial value and rose. For the film of this example, the number was found to be 25,000. The bags of this kind are often used collectively as groups of several members. Thus, the resistance to friction between two such films itself constitutes an important factor. The film of the present example excelled in this resistance.

When a white filter paper was rubbed against the surface layer of the film, it did not smear at all.

For comparison, a film of the same construction was prepared, except that the superimposition of the surface layer was omitted. By testing, the surface resistivity of this film was found to be $6 \times 10^5 \Omega$.

When a white filter paper was rubbed against the coated surface of the film it was found to be smeared in black. The volume resistivity of the surface layer in the direction of thickness was found by calculation to be $1 \times 10^9 \Omega$ cm.

When the coating material for the surface layer was independently spread in the form of a film and the film was tested for volume resistivity, the value found was $2 \times 10^{14} \Omega$ cm.

From the data, it is concluded that the film of this example gained notable reduction in the volume resistivity of the surface layer.

EXAMPLE 2

An antistatic film having a heat-sealing layer superimposed thereon was obtained by following the procedure of Example 1, except that a biaxially stretched polyester film 15 μm in thickness was used and a toluene solution containing 15% by weight of polystyrene was used as a coating material for the surface layer instead. The surface layer exhibited a surface resistivity of $9 \times 10^5 \Omega$ and the heat-sealing layer exhibited a surface resistivity of $8 \times 10^{11} \Omega$. The film as a whole exhibited a light transmittance of 45% and haze of 13% and enabled what was held thereunder to be clearly seen therethrough. When a cross section of the surface layer and the electroconductive layer of this film were observed under a microscope, protrusions of carbon black into the surface layer were recognized in much the same manner as in the film of Example 1.

This film permitted easy fabrication of bags with absolutely no rejection. The bags were opened very easily with fingers in the sealed mouths and handled easily.

The fracture strength of this film was found to be 1.7 kg and the number of frictions was found to be 4,000.

For comparison, the coating material for the surface layer was independently spread to form a film and this film was tested for volume resistivity. The value was $1 \times 10^{15} \Omega$ cm. The volume resistivity of the surface layer in the direction of thickness was calculated to be $1 \times 10^9 \Omega$ cm, indicating that the film gained notable reduction in the volume resistivity of the surface layer.

EXAMPLE 3

An electroconductive coating material was prepared by mixing the same carbon black as used in Example 1, styrenebutadiene latex containing 40% by weight of an involatile component, and water. This coating material had an involatile component content of 2% by weight. The carbon black accounted for 90% by weight of the involatile component of the coating material. This coating material was found to contain clustered particles of carbon black in a small proportion. A polypropylene film 60 μm in thickness had one surface thereof treated by a corona discharge. On the treated surface of this film, an acrylic type resin solution possessing a carboxyl group was applied as an undercoat and the aforementioned electroconductive coating material was superimposed thereon at a rate of 0.12 g/m² on dry basis. The applied layer of the coating material was dried.

The carbon black was found to be applied at a rate of 0.11 gm². The applied layer exhibited a light transmittance of 38% and haze of 25% and enabled what was held thereunder to be clearly seen therethrough. When a white filter paper was rubbed against the applied coat, it was readily smeared in black. Thus, the film was unfit for wrapping material. The surface resistivity of the applied coat was found to be $5 \times 10^3 \Omega$. On the electroconductive layer, the same acrylic resin solution as used in Example 1 was superimposed at a rate of 1 g/m² on a dry basis. The applied layer was dried. On the assumption that the specific gravity of the applied layer was 1, the thickness of the applied layer was found to be 1 μm. The surface resistivity of the applied layer was $7 \times 10^3 \Omega$. The applied layer of the acrylic resin exhibited a volume resistivity of $8 \times 10^6 \Omega$ cm. When the coating material for the surface layer was independently spread to form a film and this film was tested for volume resistivity, the value found was $2 \times 10^{14} \Omega$ cm. When the cross sections of this film were observed under a microscope, protrusions of carbon black into the surface layer were recognized in much the same manner as in the film of Example 1.

The applied layer exhibited a light transmittance of 40% and haze of 8%. When a white filter paper was rubbed against this applied layer, it was not smeared at all. This film was folded and sealed to produce a bag having the layer of acrylic resin on the inner side. A rod of polystyrene was attached as an insulation handle to one end of an aluminum sheet 5 cm square in area and 0.3 mm in thickness. This aluminum sheet was put in the film bag and, with the handle held in a hand, rubbed 50 times against the inner walls of the film bag. The aluminum sheet was immediately removed from the film bag and tested for electric field with a static field tester made by Rion Co., Ltd. The value consequently found was 12 volts/cm. The data indicate that this film bag allowed a conductor held therein to accumulate very little electricity and the film was highly fit for wrapping material of ICs.

EXAMPLE 4

An electroconductive coating material was prepared by following the procedure of Example 3, using carbon black, styrene-butadiene latex, and water. The coating material contained 2% by weight of an involatile component and the carbon black accounted for 70% by weight of the involatile component of the coating material. This coating material was found to contain clustered particles of carbon black in a small proportion.

A biaxially stretched polystyrene film 150 μm in thickness had one surface thereof treated by a corona discharge. On the treated surface of this film, the aforementioned electroconductive coating material was applied at a rate of 0.12 g/m² on a dry basis. The applied layer was dried. The carbon black was found to be applied at a rate of 0.08 g/m². The applied layer exhibited a light transmittance of 52% and haze of 19% and the film possessed transparency. When a white filter paper was rubbed against the applied layer, however, it was readily smeared in black. Thus, the film was unfit for any practical wrapping material. The applied layer exhibited a surface resistivity of $4 \times 10^5 \Omega$. On this applied layer, ethyl alcohol solution containing 15% by weight of nitrocellulose was applied at a rate of 1.6 g/m² on a dry basis. The applied layer was dried. On the assumption that the specific gravity of the nitrocellulose was 1.6, the thickness of the applied layer was found to be 1 μm. The applied layer exhibited a surface resistivity of $6 \times 10^5 \Omega$. The applied layer exhibited a light transmittance of 54% and haze of 7%. The film thus possessed satisfactory transparency and low surface resistivity. When a white filter paper was rubbed against the applied layer, it was not smeared at all.

When a cross section of this film was observed under a microscope, protrusions of carbon black into the surface layer were recognized.

For comparison, the above solution of nitrocellulose was independently spread to form a film and the film was tested for volume resistivity. The value thus found was $3 \times 10^{11} \Omega$ cm. The aforementioned surface layer of nitrocellulose was found to possess a volume resistivity of $8 \times 10^8 \Omega$ cm. The film was thus demonstrated to enjoy notable reduction in the volume resistivity. This sheet was useful for the thermoforming fabrication of trays and containers intended to wrap objects vulnerable to electrostatic damage.

EXAMPLE 5

An electroconductive coating material was prepared by mixing the same latex as used in Example 3, commercially available carbon black (produced by Denki Kagaku Kogyo K. K. and marketed as electroconductive filler under the trademark designation Denka Black), and water. This coating material contained 10% by weight of an involatile component and the carbon black accounted for 10% by weight of the involatile component. It was found to contain crustered particles of carbon black in a small proportion.

A polypropylene film 60 μm in thickness had one surface thereof treated by a corona discharge. On the treated surface of this film, the aforementioned electroconductive coating material was applied at a rate of 0.5 g/m$^2$ on dry basis. The applied layer was dried. The carbon black was found to be applied at a rate of 0.05 g/m$^2$. The applied layer exhibited a light transmittance of 35% and a haze of 15%. Thus, the film enabled what was held thereunder to be seen clearly therethrough. When a white filter paper was rubbed against the applied layer, it was found to be slightly smeared. The applied layer exhibited a surface resistivity of $2 \times 10^7 \Omega$ and possessed a relatively satisfactory antistatic property. On this applied layer, toluene solution containing 15% by weight of styrene resin was applied at a rate of 1 g/m$^2$ on dry basis. The applied layer was dried. On the assumption that the specific gravity of the layer was 1, the thickness of the applied layer was 1 μm. The surface resistivity of the applied layer was $6 \times 10^7 \Omega$. The applied layer of styrene resin exhibited a volume resistivity of $2 \times 10^{11} \Omega$ cm.

The coating solution of styrene resin was independently spread to form a film and this film was tested for volume resistivity. The value consequently found was $1 \times 10^{15} \Omega$ cm.

When a cross section of this film was observed under a microscope, partial protrusion of carbon black into the surface layer was recognized. When a white filter paper was rubbed against the applied layer, it was not smeared at all. The applied layer exhibited a light transmittance of 38% and haze of 7%. The film had improved transparency. This film was folded and sealed to prepare a bag with the applied layer of styrene resin falling on the inside. This bag was subjected to the same friction test using an aluminum sheet by following the procedure of Example 3. The electric field was found to be 16 volts/cm.

EXAMPLE 6

A biaxially stretched polypropylene film 20 μm in thickness had one surface thereof treated by a corona discharge. On the treated surface of this film, the same electroconductive coating material as used in Example 1 was applied with a gravure coater to form a flat layer containing the coating material at a rate of 0.13 g/m$^2$ on dry basis and parallel lines of increased thickness having a width of 0.5 mm, separated with intervals of 2.5 mm, and containing the coating material at a rate of 0.4 g/m$^2$ on dry basis. The applied layer was dried. On the applied layer so produced, the same surface layer as used in Example 1 was superimposed. The surface layer was dried. The carbon black was found to be applied at a rate of 0.12 g/m$^2$ in the lines of increased thickness and 0.04 g/m$^2$ in the flat layer.

When a cross section of this film was observed under a microscope, protrusions of carbon black into the surface layer were recognized.

On the untreated surface of this film, a heat-sealing layer was superimposed in the same manner as in Example 1. In the film, the surface layer exhibited a surface resistivity of $3 \times 10^5 \Omega$ and the heat-sealing layer exhibited a surface resistivity of $8 \times 10^{11} \Omega$. The film as a whole exhibited a light transmittance of 49% and haze of 16% and enabled what was held thereunder to be seen clearly therethrough. The incorporation of parallelly arranged fine lines of increased thickness in the electroconductive layer brought about improvement in both surface resistivity and light transmittance. This film was useful for the production of bags. The fracture strength of this film was found to be 1.1 kg.

EXAMPLE 7

The film of Example 3 was folded and sealed to produce a bag with the coated layer falling on the outside. In this bag, the same aluminum sheet as used in Example 3 was tested for an electric field. The value consequently found was 140 volts/cm. Compared with a bag formed with a film incorporating therein a commercially available antistatic agent (Comparative Experiment 5), the bag suffered less accumulation of electricity in a conductor held therein.

EXAMPLE 8

On the surface of the film of Example 3 opposite the coated surface thereof, a film incorporating an antistatic agent and used as a bag in Comparative Experiment 5 was superimposed, to produce a bag having the applied layer falling on the outside. Thus, the bag had inner walls formed of polyethylene incorporating the antistatic agent and outer walls formed of the applied layer. When the same aluminum sheet was tested for an electric field in the bag by following the procedure of Example 3, the value consequently found was 60 volts/cm. This value is notably low as compared with the value found in the test of Comparative Experiment 5.

COMPARATIVE EXPERIMENT 1

An electroconductive coating material was prepared using the same carbon black and latex as used in Example 3 and dispersing the carbon black in the styrene butadiene latex and water. This coating material contained 20% by weight of an involatile component. The carbon black accounted for 7% by weight of the involatile component of the coating material. Since this coating material had a lower carbon black content, it permitted carbon black to be dispersed easily in a better dispersion than the electroconductive coating material used in Example 3. A biaxially stretched polyester film 15 μm in thickness had one surface thereof treated by a corona discharge. On the treated surface of this film, the aforementioned coating material was applied and dried to form an applied layer 6 μm in thickness. The carbon black was found to be applied at a rate of 0.42 g/m$^2$. The applied layer was smooth and glossy, virtually opaque, and tarnished in jet-black.

The surface of this applied layer was pressed with a heating roller of specular finish, so as to be finished in a smoother, more glossy surface free from protrusion of carbon black. This applied layer exhibited a surface resistivity of $8 \times 10^7 \Omega$. On this surface, the same coating solution of acrylic resin as used in Example 3 was applied and dried, to give rise to an applied layer 13 μm in thickness. The surface resistivity of the applied layer was $2 \times 10^{11} \Omega$, a value insufficient for any antistatic film.

COMPARATIVE EXPERIMENT 2

A coating material containing carbon black was prepared by mixing 100 parts by weight of the same overcoating material of acrylic resin as used in Example 1 with 0.8 part by weight of the same carbon black as used in Example 1. The involatile component of this coating material thus produced contained 5% by weight of carbon black. Thus, the carbon black content of this coating material was equal to the average carbon black content of the entirely applied layer involved in Example 1.

On the same substrate film as used in Example 1, this coating material was applied at a rate of 1.3 g/m² on dry basis. The produced coated film had an applied layer of 1.3 g/m² similarly to Example 1 and had carbon black applied at the same rate of 0.06 g/m² as in Example 1. The applied layer, by test, was found to possess surface resistivity of $6 \times 10^{13} \Omega$, a value showing a total absence of any antistatic effect. This experiment demonstrates that even when carbon black is applied at the same rate as in Example 1, the produced film fails to exhibit the antistatic property aimed at by this invention owing to the lack of the specific film construction as used in Example 1, for instance.

COMPARATIVE EXPERIMENT 3

When a commercially avaiable IC wrapping bag formed with polyethylene film 60 μm in thickness incorporating therein an antistatic agent was rubbed and tested for electric charge by following the procedure of Example 1, the value of electric charge was 20 volts/cm on both front and rear sides of the film of the bag. This value is inferior to that of the bag of Example 1.

The fracture strength of the film was 0.9 kg, a value notably inferior to that of the film of Example 1.

COMPARATIVE EXPERIMENT 4

When a commercially available IC wrapping bag made of a laminate film having outside surface thereof coated with metal to a thickness small enough not to impair the transparency of the film was subjected to the same friction test as in Example 1, the number of frictions was only 300. This experiment demonstrates that the film of Example 1 far excels the metal-coated film in terms of resistance to friction.

COMPARATIVE EXPERIMENT 5

In a commercially available polyethylene bag especially prepared by having an antisatic agent incorporated in the film for the purpose of wrapping ICs or other similar objects, the same aluminum sheet as used in Example 3 was placed and rubbed, to determine the electric field of the aluminum sheet. The value consequently found was 1,500 volts/cm. The bag of this type which has an antistatic agent incorporated in the film is electrically charged sparingly in itself, while it causes the conductor held therein to generate electricity of an extremely high voltage. This experiment demonstrates that this bag is highly dangerous when used in wrapping ICs and other similar objects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antistatic sheet material consisting of:
    a substrate layer comprising a transparent plastic substance;
    an electroconductive layer disposed on one surface of said substrate layer;
    a surface layer comprising a transparent plastic substance disposed on said electroconductive layer to a thickness of 10 μm to 0.2 μm; and
    carbon black, contained in said electroconductive layer in an amount of 0.8 to 0.01 g/m², which partially protrudes into said surface layer.

2. The sheet material according to claim 1, wherein said substrate layer is a transparent and flexible plastic film.

3. The sheet material according to claim 2, wherein said flexible plastic film is a biaxially stretched heat-resistant plastic film.

4. The sheet material according to claim 1, wherein said substrate layer has a heat-sealing layer disposed on the other surface thereof.

5. The sheet material according to claim 1, wherein said substrate layer is a rigid thermoplastic sheet.

6. The sheet material according to claim 1, wherein said electroconductive layer has a thickness in the range of 5 μm to 0.01 μm.

7. The sheet material according to claim 1, wherein said electroconductive layer is formed by the application of a coating material having carbon black contained in an amount of not less than 8% by weight in an involatile component of said coating material.

8. The sheet material according to claim 1, wherein said surface layer is formed of an acrylic resin.

9. The sheet material according to claim 1, wherein said surface layer contains a polyethylene type wax.

10. The sheet material according to claim 1, wherein said electroconductive layer has continuous lines of increased thickness or increased carbon black concentration, arranged in the pattern of a net or extending parallel to one another.

11. A container in the form of bag, box, cylinder, magazine, or tray, formed of the sheet material set forth in claim 1 wherein the surface layer forms the inner surface of said container.

12. A container in the form of bag, box, cylinder, magazine, or tray, formed of the sheet material of claim 2, wherein the surface layer forms the inner surface of said container.

13. A container in the form of bag, box, cylinder, magazine, or tray, formed of the sheet material of claim 3, wherein the surface layer forms the inner surface of said container.

14. A container in the form of bag, box, cylinder, magazine, or tray, formed of the sheet material of claim 4, wherein the surface layer forms the inner surface of said container.

15. A container in the form of bag, box, cylinder, magazine, or tray, formed of the sheet material of claim 5, wherein the surface layer forms the inner surface of said container.

16. A container in the form of bag, box, cylinder, magazine, or tray, formed of the sheet material of claim 6, wherein the surface layer forms the inner surface of said container.

17. A container in the form of bag, box, cylinder, magazine, or tray, formed of the sheet material of claim 7, wherein the surface layer forms the inner surface of said container.

18. A container in the form of bag, box, cylinder, magazine, or tray, formed of the sheet material of claim 8, wherein the surface layer forms the inner surface of said container.

19. A container in the form of bag, box, cylinder, magazine, or tray, formed of the sheet material of claim 9, wherein the surface layer forms the inner surface of said container.

20. A container in the form of bag, box, cylinder, magazine, or tray, formed of the sheet material of claim 10, wherein the surface layer forms the inner surface of said container.

* * * * *